US009253788B2

(12) United States Patent
Roh et al.

(10) Patent No.: US 9,253,788 B2
(45) Date of Patent: Feb. 2, 2016

(54) RESOURCE ALLOCATION METHOD AND APPARATUS OF BASE STATION IN WIRELESS COMMUNICATION SYSTEM

(71) Applicant: Samsung Electronics Co. Ltd., Suwon-si, Gyeonggi-do (KR)

(72) Inventors: Kwanhee Roh, Hwaseong-si (KR); Jaeyun Ko, Suwon-si (KR); Sungho Lee, Seoul (KR); Inseok Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 13/724,685

(22) Filed: Dec. 21, 2012

(65) Prior Publication Data

US 2013/0163540 A1    Jun. 27, 2013

(30) Foreign Application Priority Data

Dec. 26, 2011    (KR) .......................... 10-2011-0141876

(51) Int. Cl.
*H04W 72/08*    (2009.01)
*H04W 72/12*    (2009.01)
*H04W 72/10*    (2009.01)

(52) U.S. Cl.
CPC ............ *H04W 72/085* (2013.01); *H04W 72/10* (2013.01); *H04W 72/1226* (2013.01); *H04W 72/1247* (2013.01)

(58) Field of Classification Search
None
See application file for complete search history.

(56) References Cited

U.S. PATENT DOCUMENTS

| 2007/0098093 | A1* | 5/2007 | Kwon et al. ................... 375/260 |
| 2009/0147743 | A1* | 6/2009 | Parkvall et al. ................ 370/329 |
| 2010/0167773 | A1* | 7/2010 | Oota .............................. 455/517 |
| 2010/0232366 | A1* | 9/2010 | Iwamura et al. ............... 370/329 |

* cited by examiner

*Primary Examiner* — Michael Thier
*Assistant Examiner* — Brian Cox
(74) *Attorney, Agent, or Firm* — Jefferson IP Law, LLP

(57) ABSTRACT

A resource allocation method and apparatus for reducing the number of operations required when determining the resource allocation priority in the wireless packet data communication system supporting plural types of resources are provided. The method includes receiving channel quality identifiers from at least one terminal for resource allocation, selecting one of the channel quality identifiers as a representative channel quality identifier per terminal, determining a resource allocation priority of the terminal based on the representative channel quality identifier, and allocating the resource in order of resource allocation priority.

12 Claims, 5 Drawing Sheets

RESOURCE ALLOCATION METHOD AND APPARATUS OF BASE STATION IN WIRELESS COMMUNICATION SYSTEM

PRIORITY

This application claims the benefit under 35 U.S.C. §119 (a) of a Korean patent application filed on Dec. 26, 2011 in the Korean Intellectual Property Office and assigned Serial No. 10-2011-0141876, the entire disclosure of which is hereby incorporated by reference.

BACKGROUND OF THE INVENTION

1. Field of the Invention

The present invention relates to a resource allocation method and apparatus of a base station in a wireless communication system. More particularly, the present invention relates to a resource allocation method and apparatus for reducing the number of operations required when determining the resource allocation priority in a wireless packet data communication system supporting plural types of resources.

2. Description of the Related Art

Mobile communication systems have been developed to provide subscribers with voice communication services while a user is on the move. With the rapid advance of technologies, the mobile communication systems have evolved to support high speed data communication services as well as standard voice communication services. However, a limited number of resources and a desire for higher speed services in the current mobile communication system have spurred an evolution to a more advanced mobile communication system.

A proportional fairness scheduler allocates resources to candidate terminals (hereinafter, interchangeably referred to as "Mobile Station" and "MS") in descending order of a scheduling metric calculated based on the currently available data rate and the average data rate assigned to the MS. However, the conventional scheduling scheme does not perform a proportional fairness scheduling scheme based on throughput.

Therefore, in the case of adopting the proportional fairness scheduling scheme, there is a need of a method for performing the scheduling operation efficiently from the viewpoint of throughput while minimizing the loss of system throughput.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a resource allocation method and apparatus that is capable of reducing the number of operations required for calculating resource allocation priority in the wireless packet data communication system supporting plural types of resources.

In accordance with an aspect of the present invention, a method for a base station to allocate a resource configured in at least one resource region to terminals in a wireless communication system is provided. The method includes receiving channel quality identifiers from at least one terminal for resource allocation, selecting one of the channel quality identifiers as a representative channel quality identifier per terminal, determining a resource allocation priority of the terminal based on the representative channel quality identifier, and allocating the resource in order of resource allocation priority.

In accordance with another aspect of the present invention, a base station for allocating a resource configured in at least one resource region to terminals in a wireless communication system is provided. The base station includes a radio communication unit for transmitting and receiving signals to and from the terminals, a modem for demodulating the signals transmitted by the terminals to extract channel quality identifiers for the respective resource regions, and a resource allocation scheduler for selecting one of the channel quality identifiers as a representative channel quality identifier per terminal, for determining a resource allocation priority of the terminal based on the representative channel quality identifier, and for allocating the resource in order of resource allocation priority.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
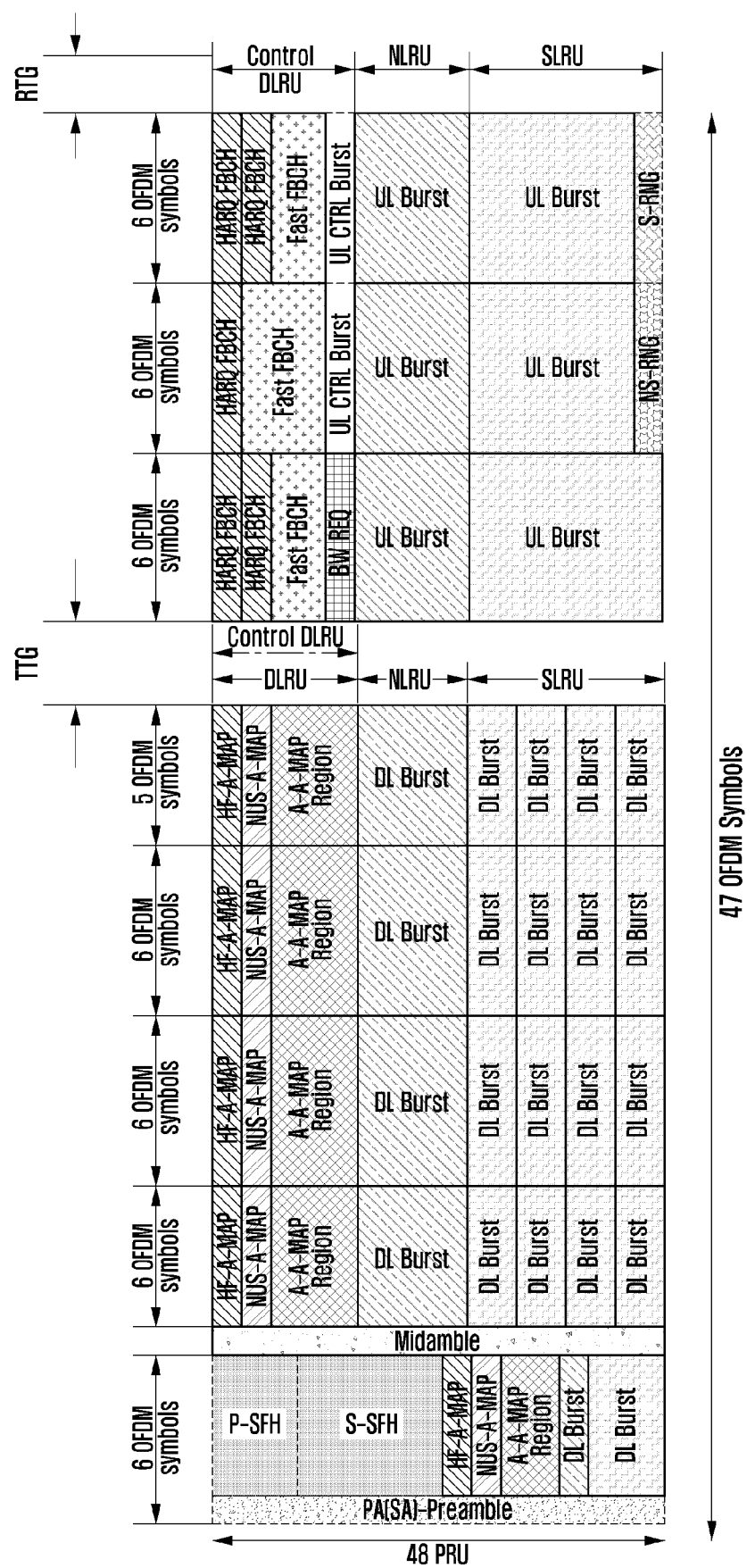
FIG. 1 is a diagram illustrating a resource structure of an Institute of Electrical and Electronics Engineers (IEEE) 802.16m system operating with 10 MHz bandwidth supporting a Miniband Logical Resource Unit (MLRU), a Diversity Logical Resource Unit (DLRU), and a Subband Logical Resource Unit (SLRU) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The recent mobile communication systems are configured to support multiplexing multiple types of resources into the same subframe. For example, the Institute of Electrical and Electronics Engineers (IEEE) 802.16m system supports multiplexing three types of resources (i.e., Diversity Logical Resource Unit (DLRU), Miniband Logical Resource Unit (MLRU), and Subband Logical Resource Unit (SLRU)) into a subframe. The resource type can be categorized into one of a sub-band type for the resource contiguous in view of frequency and a diversity type for the resource distributed over the entire band or a part of the band in view of frequency. In the IEEE 802.16m system, the DLRU and MLRU belong to the diversity type resource while the SLRU belongs to the subband type resource.

The feedback scheme of a Mobile Station (MS) is determined depending on the resource type and available Multiple Input Multiple Output (MIMO) transmission mode and especially, in the IEEE 8802.16m system, referred to as a MIMO Feedback Mode. For example, since DLRU and MLRU are classified into the diversity subchannel type, the MS allocated Modified Frequency Modulation (MFM) related to the corresponding resource region reports the information including wideband Channel Quality Indicator (CQI) and Rank to the base station. In the case of SLRU, CQI is reported per subband separately.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a resource structure of an IEEE 802.16m system operating with 10 MHz bandwidth supporting MLRU, DLRU, and SLRU according to an exemplary embodiment of the present invention.

Referring to FIG. 1, the mobile communication system operating with limited resources typically adopts a resource allocation priority determination algorithm, such as proportional fairness scheduling, in order to guarantee fair resource allocation, especially to the MS at the cell edge, while maximizing the system throughput.

In this case, the proportional fairness scheduler determines the resource allocation priorities of the candidate MSs in descending order of scheduling metric using Equation (1):

$$PF\_Metric[k] = R(k,n)/T_{avg}(k,n) \qquad \text{Equation (1)}$$

In Equation (1), k denotes the candidate MS index, n denotes time, and R denotes channel quality as the data rate available with the resource allocated to the MS k. In addition, $T_{avg}$ denotes the average data rate allocated to the MS k, i.e., resources allocated to the MS for the time period T.

As known from Equation (1), the better the channel quality and the lower the allocated average data rate, the higher the scheduling metric (i.e., PF_Metric) value. With a higher scheduling metric value, the MS can be allocated a resource with higher priority.

The proportional fairness scheduling scheme is capable of improving the system throughput as well as guaranteeing scheduling allocation fairness.

The MIMO transmission mode is selected depending on the type of resource used in the system. In addition, the channel quality per subband in SLRU varies according to the frequency-selective fading and thus influence to the system throughput. In such a situation, in order to increase the system throughput and guarantee the fairness of resource allocation, it is required to calculate the scheduling metric in consideration of the channel quality and capacity per resource region (i.e., sub-channel of DLRU, MLRU, and SLRU) and allocate resources to the candidate MSs in the highest metric first order.

Table 1 is an exemplary scheduling metric table including the scheduling metric values calculated per resource region based on the CQIs and Space-Time Code (STC) rates reported by three MSs. In Table 1, the resource region-specific scheduling metrics are calculated based on the CQIs fed back by MSs or estimated by the base station.

TABLE 1

| Region-specific scheduling metric | DLRU | MLRU | SLRU | | | |
|---|---|---|---|---|---|---|
| | | | Sub-band 0 | Sub-band 1 | Sub-band 2 | Sub-band 3 |
| MS1 | 2 | 10 | 7 | 7 | 7 | 7 |
| MS2 | 5 | 8 | 3 | 12 | 11 | 6 |
| MS3 | 4 | 9 | 8 | 9 | 9 | 5 |

In the situation summarized as shown in Table 1, two approaches can be considered for fair resource allocation to MSs. The first approach is to give resource allocation priority to the candidate MSs in the highest scheduling metric-first order from one resource region to another. The second approach is to calculate the scheduling metrics of the MSs in the respective resource regions and give the resource allocation priorities to entire candidate MSs in the higher scheduling metric-first order.

Assuming that the queues for respective MSs are large enough, both exemplary methods allocate the resource to the terminals in the high scheduling metric-first order in each region and thus there is no difference in allocation result. However, if there is any MS having a queue not large enough among the MSs, it is preferred to use the second exemplary method which gives the resource allocation priority in the highest scheduling metric-first order to the first exemplary method which calculates the allocation priority independently for the respective resource types from the MS's view point. This is because the channel quality in the resource region having the large scheduling metric is better in view of the MS since the per-resource region channel quality, i.e., CQI, is reflected in the scheduling metric value.

A description is made of the difference of resource regions allocated to each MS between the two exemplary methods under the exemplary situation as summarized in Table 1 hereinafter.

In the first exemplary method, the MSs are sorted in descending order of scheduling metric per resource region and granted the allocation priority in a highest scheduling metric-first order from one resource region to another. For example, the allocation priority is granted in the order of MS2→MS3→MS1 for DLRU, MS1→MS3→MS2 for MLRU, MS3→MS1→MS2 for SLRU subband 0, MS2→MS3→MS1 for SLRU subband 1, MS2→MS3→MS1 for SLRU subband 2, and MS1→MS2→MS3 for SLRU subband 3.

In the second exemplary method, the MSs are sorted in descending order of scheduling metric for the entire resource region and granted the allocation priority in the highest scheduling metric-first order. In this case, the allocation priority is granted in the following order of (subband 1, MS2)→(subband 2, MS2)→(MLRU, MS1)→(MLRU, MS3)→(subband 1, MS3)→(subband 1, MS3)→(MLRU, MS2)→(subband 0, MS3)→(subband 0, MS1)→(subband 1, MS1)→(subband 2, MS1)→(subband 3, MS1)→(subband 3, MS2)→(DLRU, MS2)→(subband 3, MS3)→(DLRU, MS3).

In the above exemplary methods, assuming that the queues for MS1 and MS3 are large enough to accommodate all the resource regions and the queue for MS 2 is so small as to be filled up with the allocation in one resource region, the resource allocation priorities are granted differently in the first and second exemplary methods as shown in Table 2.

TABLE 2

| Allocation order | Exemplary Method 1 | Exemplary Method 2 |
| --- | --- | --- |
| 1 | MS2 in DLRU (MS2's queue is processed completely) | MS2 in SLRU subband 1 (MS2's queue is processed completely) |
| 2 | MS1 in MLRU | MS1 in MLRU |
| 3 | MS3 in SLRU subband 0 | MS3 in SLRU subband 2 |
| 4 | MS3 in SLRU subband 1 (MS2's queue is empty) | MS2 in SLRU subband 0 |
| 5 | MS3 in SLRU subband 2 (MS2's queue is empty) | MS1 in SLRU subband 3 |
| 6 | MS1 in SLRU subband 3 | MS3 in DLRU |

The two exemplary methods differ from each other in that the second exemplary method guarantees the resource allocation for the MSs with good scheduling metric per resource region so as to increase the system throughput as compared to the first exemplary method.

As described above, the exemplary scheduling method is capable of maximizing frequency spectrum efficiency in such a way of sorting the scheduling metric values calculated per resource region in association with all resource allocation candidate MSs to allocate the resource to the MSs in the highest scheduling metric-first order. In order to allocate the resource efficiently in view of the throughput based on the CQIs reported for the respective resource regions, it is necessary to calculate Proportional Fairness (PF) metric (i.e., scheduling metric) per resource region and sort the MSs in association with all items, resulting in an increase of operation complexity.

Table 3 is an exemplary scheduling metric table including scheduling metric values per resource type. The entire resource region is divided into 1 DLRU, 1 MLRU, and 4 SLRU regions. Assuming total N active MSs, 6N operations are required. Moreover, in order to allocate the resource to the MSs in the highest priority-first order, 6N sorting operations are required.

TABLE 3

| | | SLRU | | | |
| --- | --- | --- | --- | --- | --- |
| DLRU | NLRU | Subband 1 | Subband 2 | Subband 3 | Subband 4 |
| F dlru.1 | F nlru.1 | F sb1.1 | F dlru.1 | F nlru.1 | F sb1.1 |
| F dlru.2 | F nlru.2 | F sb1.2 | F dlru.2 | F nlru.2 | F sb1.2 |
| F dlru.3 | F nlru.3 | F sb1.3 | F dlru.3 | F nlru.3 | F sb1.3 |
| F dlru.4 | F nlru.4 | F sb1.4 | F dlru.4 | F nlru.4 | F sb1.4 |
| F dlru.5 | F nlru.5 | F sb1.5 | F dlru.5 | F nlru.5 | F sb1.5 |
| ... | ... | ... | ... | ... | ... |
| F dlru.N | F nlru.N | F sb1.N | F dlru.N | F nlru.N | F sb1.N |

In the recent mobile communication systems, it is the tendency to reduce the length of Transmission Time Interval (TTI) to reduce the transmission latency. For example, the TTI of IEEE 802.16m is 0.617 ms which is about ⅛ of 5 ms TTI of the legacy IEEE 802.16e. With the reduction of TTI length, it is required to increase the power in inversely proportional to shortened TTI for processing the operation with the same complexity level.

However, it is a significant burden to increase the processing power to 8 folds in a real system as shown in the example of IEEE 802.16e and 802.16m. In this respect, there is a need for a method for reducing the number of operations efficiently when determining resource allocation priority.

An exemplary embodiment of the present invention proposes a scheduling method that is capable of reducing the number of operations without compromising the system throughput in the wireless communication system supporting various types of resources.

Figure 2:
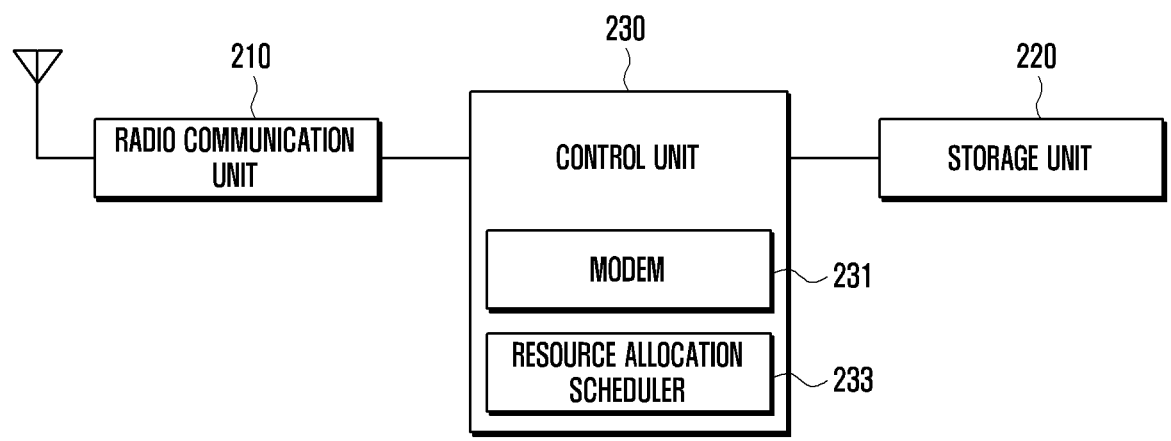
FIG. 2 is a block diagram illustrating a configuration of a base station according to an exemplary embodiment of the present invention.

FIG. 2 is a block diagram illustrating a configuration of a base station according to an exemplary embodiment of the present invention.

Referring to FIG. 2, the base station includes a radio communication unit 210, a storage unit 220, and a control unit 230.

The radio communication unit 210 is responsible for transmitting and receiving control signals and data. The radio communication unit 210 is capable of including a Radio Frequency (RF) transmitter for up-converting and amplifying the signal to be transmitted and an RF receiver for low noise amplifying and down-converting the received signal. The radio communication unit is also capable of delivering the control and data signals received through a radio channel to the control unit 160 and transmitting the data output by the control unit 160 through the radio channel. The radio communication unit 210 is capable of receiving a CQI transmitted by the MS through dedicated uplink feedback channel and delivers the received CQI to the control unit 230.

The storage unit 220 is responsible for storing programs and data associated with the operation of the base station. More particularly, the storage unit 120 is capable of storing the algorithm for reducing the number of operations necessary when determining resource allocation metrics in the wireless packet data communication system supporting plural types of resources.

The control unit 230 is responsible for controlling overall operations of the internal function blocks of the base station. More particularly, the control unit 230 is capable of determining the resource allocation priority across the entire resource region based on the representative CQI per MS in the proportional scheduling procedure, selecting candidates among the resource regions having the channel quality equal to or greater than a predefined threshold among the resource regions (i.e., bands) per MS, calculating scheduling metrics for the selected candidates, and sorting the scheduling metrics. In order to accomplish this, the control unit 130 includes a modem 231 and a resource allocation scheduler 233.

The modem 231 is responsible for demodulating incoming signals received by the radio communication unit 210 and modulating outgoing signals to be transmitted through the radio communication unit 210. According to an exemplary embodiment of the present invention, if the CQI information transmitted by an MS is received, the modem 231 performs demodulation on the CQI and transfers the CQI to the resource allocation scheduler 233.

The resource allocation scheduler 233 updates the CQI per resource region based on the CQIs received from the modem. In this case, the CQI fed back by the MS can be the resource region-specific CQI, and the CQI for the resource region which the MS has not reported can be the CQI estimated by the resource allocation scheduler.

The resource allocation scheduler 232 updates the resource region-specific (band-specific) CQIs, calculates a representative CQI per MS, and determines the resource allocation priority based on the representative CQI per MS. If the resource allocation priority is determined, the resource allocation scheduler 232 allocates the resource to the MSs in the highest priority-first order.

Figure 3:
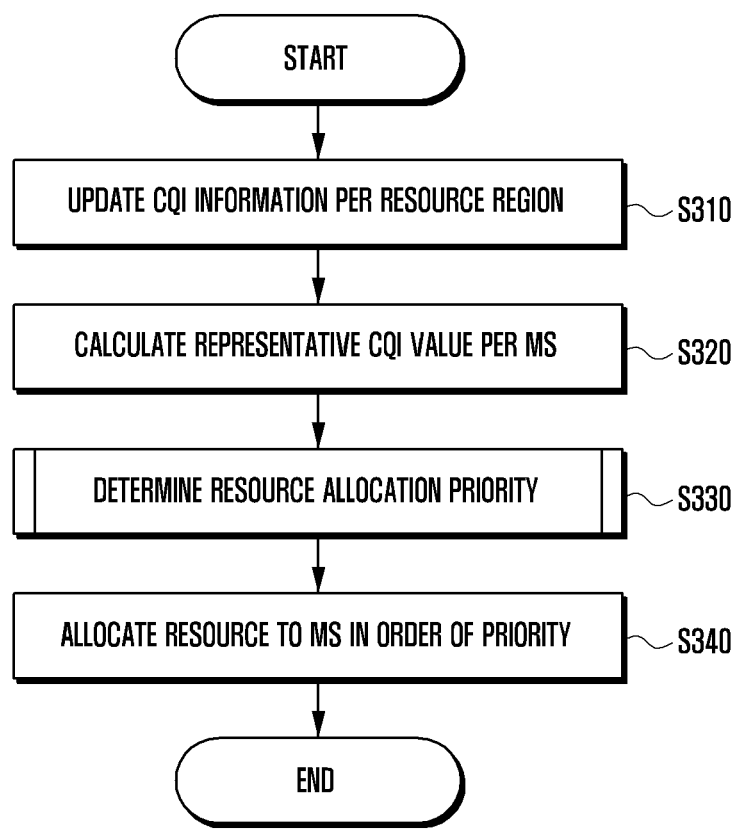
FIG. 3 is a flowchart illustrating a resource allocation method of a base station according to an exemplary embodiment of the present invention.

FIG. 3 is a flowchart illustrating a resource allocation method of a base station according to an exemplary embodiment of the present invention.

Referring to FIG. 3, the radio communication unit 210 of the base station first receives signals carrying CQIs transmitted by MSs and sends signals to the modem 231. The modem 231 demodulates the signals to send the CQIs to the resource allocation scheduler.

The resource allocation scheduler 232 updates the CQIs per resource region at step S310. Thereafter, the resource allocation scheduler 232 calculates a representative CQI value per MS at step S320. In this case, the representative CQI value of the MS can be the average value or maximum value of the CQI for the entire band or the average CQI value for a partial region.

The resource allocation scheduler 232 determines the resource allocation priority of each MS at step S330. The resource allocation procedure for each MS is described below with reference to FIG. 4. Thereafter, the resource allocation scheduler 232 allocates the resource to the MSs in a higher priority-first order at step S340.

Figure 4:
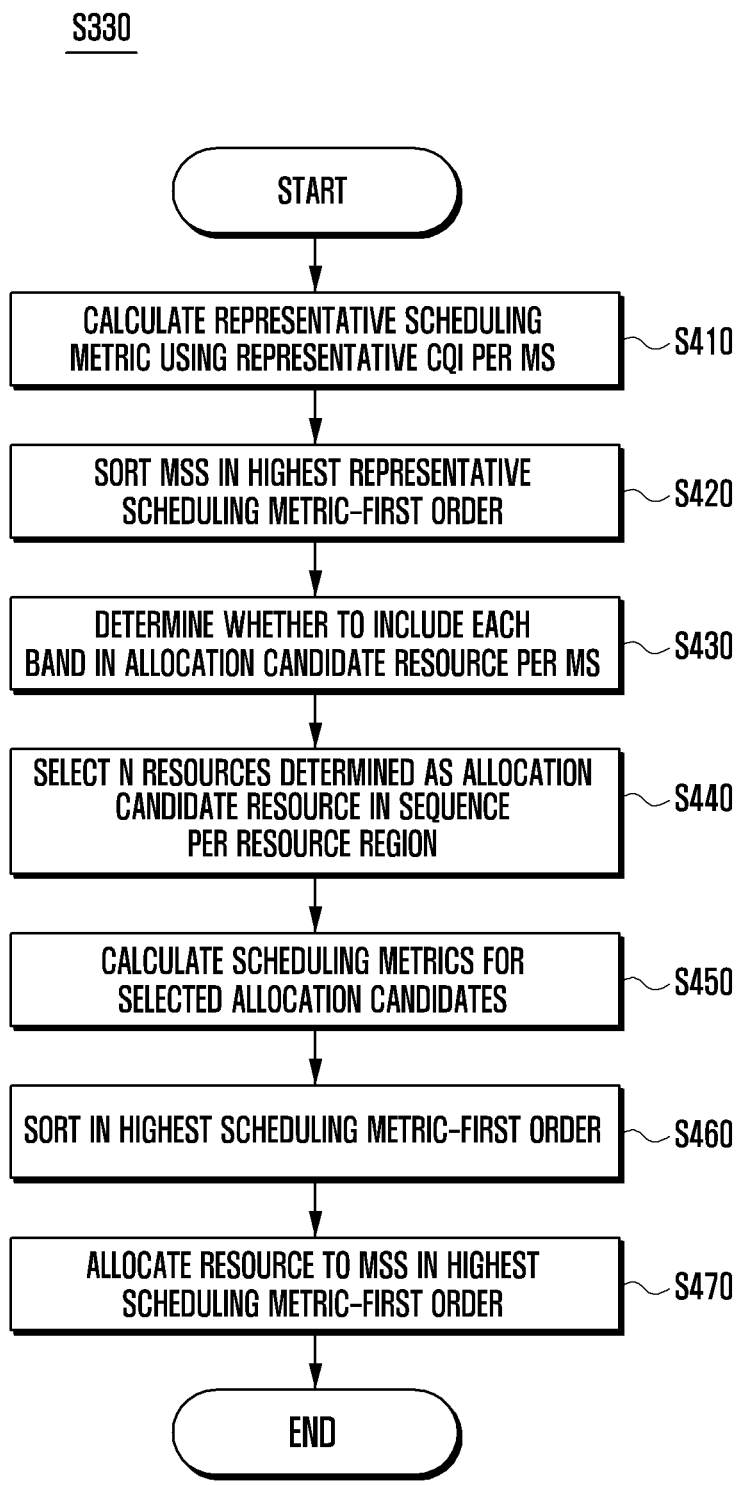
FIG. 4 is a flowchart illustrating a resource allocation priority determination step according to an exemplary embodiment of the present invention.
Figure 5:
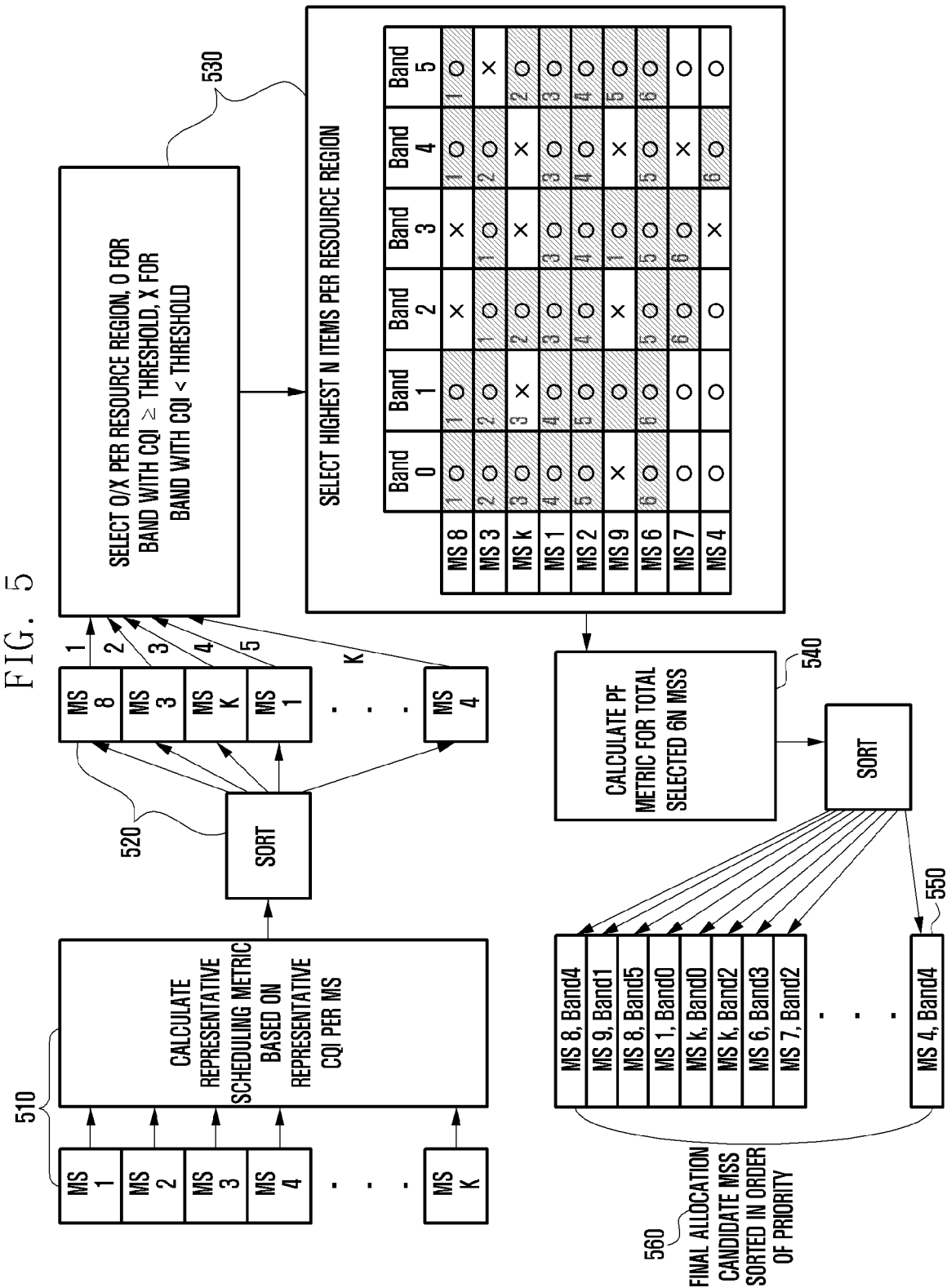
FIG. 5 is a diagram illustrating operations of a base station for selecting allocation candidates per resource region according to an exemplary embodiment of the present invention.

FIG. 4 is a flowchart illustrating a resource allocation priority determination step according to an exemplary embodiment of the present invention. FIG. 5 is a diagram illustrating operations of a base station for selecting allocation candidates per resource region according to an exemplary embodiment of the present invention. The resource allocation priority determination procedure depicted in FIG. 4 is described with reference to FIG. 5.

Referring to FIGS. 4 and 5, the resource allocation scheduler 232 calculates the representative scheduling metric of each MS based on the representative CQI of each MS at step S410. The representative scheduling metric calculation is performed using the structure as denoted by reference number 510 of FIG. 5.

The resource allocation scheduler 232 sorts the MSs in a descending order of the representative scheduling metric at step S420. This step is performed using the structure as denoted by reference number 520 of FIG. 5.

The resource allocation scheduler 232 determines the bands to be included as the candidate resource for each MS at step S430. In this case, the resource allocation scheduler determines whether to include each band in the allocation candidate resource per MS using the table as denoted by reference number 530 of FIG. 5.

Referring to table 530, the resource allocation scheduler 232 is capable of using one of the following criteria to determine whether to include each band in the resource allocation candidates:

Criterion 1) representative CQI value,
Criterion 2) highest CQI value among all bands,
Criterion 3) average CQI value of SLRU type resource subband, and
Criterion 4) value obtained by reflecting offset to criteria 1), 2), or 3).

If the CQI value of each band is equal to or greater than the threshold value, it is determined as true "O" and, otherwise, "X".

Thereafter, the resource allocation scheduler 232 selects N candidate resources, i.e., resource determined as "O" sequentially per resource region at step S440. Since 6 resource regions exist in the exemplary case of table 530 of FIG. 5, a total of 6N allocation candidates are selected.

The resource allocation scheduler 232 calculates the scheduling metrics for the selected candidates at step S450. This step is performed using the structure as denoted by reference number 540 of FIG. 5. The resource allocation scheduler 232 sorts the MS-band pairs in a descending order of scheduling metric at step S470. This step is performed using the structure as denoted by reference number 550.

The resource allocation scheduler 232 allocates the resource to the MSs in the highest scheduling metric-first order. This step is performed using the structure as denoted by reference number 560 of FIG. 5.

According to an exemplary embodiment of the present invention, the per-MS representative CQI calculation and sorting procedure of the resource allocation scheduler 232 can be performed at a predefined time period (i.e., an integer multiple of TTI) other than TTI to further reduce the number of operations in representative CQI value calculation and sort-out.

As described above, the exemplary scheduling candidate selection method is capable of reducing the number of operations required for a scheduling metric calculation and sort-out in such a way of determining the allocation priorities in the entire resource region based on the representative CQI value per MS and selecting only the resource regions of which channel quality is equal to or greater than a predefined threshold as allocation candidates.

Assuming a system with 100 MSs and 6 resource regions, the conventional method has to perform scheduling metric calculations 600 times and sorts out 600 items. However, the proposed exemplary method can acquire the same result by performing 100 scheduling metric calculations based on the representative CQIs and sorting 100 items and scheduling metric calculations and sort-outs for selected 6N items. Assuming that N is 6, the total number of operations for calculating the scheduling metrics is 136 with 100 item sort-outs and 36 item sort-outs. Accordingly, the complexity of the scheduling metric calculation procedure is reduced to about 23% and the sort-out operation (assuming N*log(N)) is reduced to 15% as compared to the conventional method.

With the proposed exemplary method, although the scheduling efficiency decreases, there is no significant throughput difference as compared to the conventional method. According to the simulation result, the throughput difference between the proposed and conventional methods is below 2~3% in the multi-cell environment.

While the invention has been shown and described with reference to certain exemplary embodiments thereof, it would be understood by those skilled in the art that various changes in form and details may be made therein without departing from the spirit and scope of the invention as defined by the appended claims and their equivalents.

What is claimed is:

1. A method for a base station to allocate a resource configured in at least one band to terminals in a wireless communication system, the method comprising:
   receiving channel quality identifiers per band from at least one terminal for resource allocation;
   determining a representative channel quality identifier per terminal;
   determining whether to include each band in allocation candidate resources per terminal;
   determining a resource allocation priority of the terminal based on the representative channel quality identifier, channel quality identifiers per band and the result of the determination of whether to include each band in allocation candidate resources per terminal; and
   allocating the resource in order of resource allocation priority.

2. The method of claim 1, wherein the determining of the resource allocation priority of the terminal comprises:
   calculating representative scheduling metrics of respective terminals based on the representative channel quality identifiers;
   sorting the representative scheduling metrics in a descending order;
   selecting a predefined number of allocation candidate resources per band;
   calculating the scheduling metrics for the selected resources; and
   granting the resource allocation priority in a highest scheduling metric-first order based on the calculated scheduling metrics.

3. The method of claim 2, wherein the calculating of the representative scheduling metrics of respective terminals and the sorting of the representative scheduling metrics is performed at a predefined time period.

4. The base station of claim 3, wherein the determining of whether to include a band corresponding to each representative scheduling metric in allocation candidate resources per terminal uses at least one of a representative channel quality identifier value, highest channel quality identifier value among all bands, and an average channel quality identifier value.

5. The method of claim 1, wherein the representative channel quality identifier comprises at least one of an average value of channel quality identifiers for all bands of the resource, a maximum value of the channel quality identifiers of all bands of the resource, and an average value of average channel quality identifiers in a partial band.

6. The method of claim 1, wherein the selecting of the one of the channel quality identifiers comprises determining the representative channel quality identifier at a predefined period.

7. The method of claim 1, wherein the determining of whether to include a band corresponding to each representative scheduling metric in allocation candidate resources per terminal uses at least one of a representative channel quality identifier value, highest channel quality identifier value among all bands, and an average channel quality identifier value.

8. A base station for allocating a resource configured in at least one band to terminals in a wireless communication system, the base station comprising:
   a radio communication unit for transmitting and receiving signals to and from the terminals;
   a modem for demodulating the signals transmitted by the terminals to extract channel quality identifiers for the respective bands; and
   a resource allocation scheduler for determining a representative channel quality identifier per terminal, for determining a resource allocation priority of the terminal based on the representative channel quality identifier, channel quality identifiers per band and the result of the determination of whether to include each band in allocation candidate resources per terminal, and for allocating the resource in order of resource allocation priority.

9. The base station of claim 8, wherein the resource allocation scheduler calculates representative scheduling metrics of respective terminals based on the representative channel quality identifiers, sorts the representative scheduling metrics in a descending order, selects a predefined number of allocation candidate resources per band, calculates the scheduling metrics for the selected resources, and grants the resource allocation priority in a highest scheduling metric-first order based on the calculated scheduling metrics.

10. The base station of claim 9, wherein the calculating of the representative scheduling metrics of respective terminals and the sorting of the representative scheduling metrics is performed at a predefined time period.

11. The base station of claim 8, wherein the representative channel quality identifier comprises at least one of an average value of channel quality identifiers for all bands of the resource, a maximum value of the channel quality identifiers of all bands of the resource, and an average value of average channel quality identifiers in a partial band.

12. The base station of claim 8, wherein the resource allocation scheduler determines the representative channel quality identifier at a predefined period.

\* \* \* \* \*